(12) United States Patent
Carlson et al.

(10) Patent No.: US 6,766,324 B2
(45) Date of Patent: Jul. 20, 2004

(54) SYSTEM AND METHOD FOR DEFINING, CONFIGURING AND USING DYNAMIC, PERSISTENT JAVA CLASSES

(75) Inventors: Brent Carlson, Rochester, MN (US); Valquiria Cristina da Cruz, Arlington Heights, IL (US); Tim Graser, Rochester, MN (US); Mircea P. Marandici, Boca Raton, FL (US); Gary Joseph Pietrocarlo, Deerfield Beach, FL (US); Andre Tost, Rochester, MN (US); Craig Dean Woods, Hopewell Junction, NY (US); Ravindran Yelchur, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 09/909,489

(22) Filed: Jul. 20, 2001

(65) Prior Publication Data

US 2003/0056022 A1 Mar. 20, 2003

(51) Int. Cl.[7] .............................................. G06F 17/30
(52) U.S. Cl. ..................................... 707/10; 707/103 R
(58) Field of Search ......................... 707/10, 100, 102, 707/103 R, 104.1, 204; 709/201, 203, 217, 219, 225, 226; 345/619; 717/103, 107, 108, 126; 719/315, 328

(56) References Cited

U.S. PATENT DOCUMENTS

| | | | | |
|---|---|---|---|---|
| 6,597,366 B1 | * | 7/2003 | Bennett et al. | ............. 345/619 |
| 6,633,892 B1 | * | 10/2003 | Chan et al. | ................. 707/204 |
| 6,684,387 B1 | * | 1/2004 | Acker et al. | ................ 717/126 |

* cited by examiner

Primary Examiner—Diane D. Mizrahi
Assistant Examiner—Apu Mofiz
(74) Attorney, Agent, or Firm—Arnall Golden Gregory LLP

(57) ABSTRACT

A system, method, and computer program for the creation and implementation of configurable Java classes on a computer platform executing instructions based upon at least a set of Java language instructions. The configurable Java class is created as an instance of a metaclass object included within the set of Java language instructions, and the configurable metaclass object includes a plurality of subclasses and interfaces wherein each interface includes one or more methods to alter the attributes and methods of the Java class instance of the metaclass object. The metaclass object is preferably implemented as an Enterprise JavaBean.

13 Claims, 2 Drawing Sheets

SYSTEM AND METHOD FOR DEFINING, CONFIGURING AND USING DYNAMIC, PERSISTENT JAVA CLASSES

BACKGROUND OF THE INVENTION

1. Field of the Invention

The present invention generally relates to computer systems and object-oriented programming languages. More particularly, the present invention relates to the design and use of persistent configurable Java classes that have attributes and methods that are alterable during run-time of the system without requiring the removal and redeployment of the classes.

2. Description of the Related Art

In volatile industries, where standards are being formed, such as in the world of business to business (B2B) systems, developers need to be able to adjust applications rapidly. This includes making changes to the implemented business processes and the data these processes work with. In an object-oriented environment, this leads to the requirement of being able to define new classes (behavior and state) and to change existing classes within the application, without disrupting any of the existing functionality, and without having to "redeploy" the application into its target environment. For example, if an existing application with a business-to-business (B2B) interface needs to react to evolving data exchange format standards rapidly, new definitions of that standard lead to new and changed behavior and state within the existing application.

In a business computer environment, Enterprise JavaBeans (EJB) is a common server-side component architecture for the Java 2 Platform, Enterprise Edition (J2EE). EJB is a specification that defines a standard architecture for implementing the business logic of multi-tier applications as reusable components. In addition to EJB components, the EJB architecture has servers, containers, and clients.

There are three categories of EJB methods: home interface methods, business logic methods, and container interaction methods. Home interface methods correspond to methods in the bean's home interface, and such methods are largely for creating, locating and accessing instances of the bean. Business logic methods are methods provided by the bean's remote interface to facilitate the functionality of the bean in its intended business environment. Container interaction methods are methods for interacting with the container and are not intended for client access. Consequently, the container access methods are hidden by the container.

There are two types of enterprise beans: session beans and entity beans, and each type of bean represents a different level of business logic abstraction. Session beans represent behavior associated with client sessions generally implemented to perform a sequence of tasks within the context of a transaction. A session bean runs processes on behalf of the client remotely on the server as a logical extension of the client program. Entity beans represent specific data or collections of data, such as a row in a relational database. Entity bean methods provide operations for acting on the data represented by the bean. An entity bean is persistent and survives as long as its data remains in the database.

A client accesses an Enterprise JavaBean by looking up the instance of the class implementing its home interface by name. The client then uses methods of the home interface to acquire access to an instance of the class implementing the remote interface. In addition to generating classes to implement both the home and remote interface, the container is responsible for binding the home class using a name server, which it communicates with via the standard JNDI API. Such function is generally handled automatically by the container tools at deployment time.

A container provides Enterprise Java Beans components with services of several types. First, the container provides services for lifecycle management and instance pooling, including creation, activation, passivation, and destruction. Second, the container intercedes between client calls on the remote interface and the corresponding methods in a bean to enforce transaction and security constraints. The container can provide notification at the start and end of each transaction involving a bean instance. Finally, the container enforces policies and restrictions on bean instances, such as reentrance rules, security policies, and others.

The tools for a container generate additional classes for a session bean at deployment time. These tools get information from the EJB architecture at deployment time based upon the EJB's deployment descriptor or by introspecting the architecture classes and interfaces. The tools use this information to dynamically generate two classes to implement the home and remote interfaces of the bean. The interface classes enable the container to intercede in all client calls on the session bean. The container also generates a serializable "Handle" class, providing a way to identify a session bean instance within a specific life cycle. Such classes can be implemented to mix in container-specific code for performing customized operations and functionality. In addition to custom classes, each container provides a class to provide metadata to the client and implements the SessionContext interface to provide access to information about the environment in which a bean is invoked.

Session beans are not persistent, whether stateful or stateless. The data maintained by a stateful session bean is transitional, and solely for the purposes of a particular session with a particular client. A stateful session bean instance does not survive system failures and other destructive events. While a session bean has a container-provided identity (the "handle"), that identity passes when the session bean is removed by the client at the end of a session. If a client needs to revive a stateful session bean that has disappeared, it must provide its own means to reconstruct the disappeared bean's state. The entity bean developer defines the home and remote interfaces that represent the client view of the bean. Entity bean developers also create a class that implements the EntityBean interface, as well as methods corresponding to the methods in that bean's home and remote interfaces. In addition to defining methods in the EJB Home interface, the entity bean developer also implements finder methods.

A "finder" method provides a way to access an entity bean through the bean's contents. Finder methods are designed to be introspected and displayed by development and deployment tools, which enables a user to graphically manipulate entity beans in the process of developing applications. The principal finder method that must be implemented by all entity beans is "findByPrimaryKey." In addition to this method, the developer can implement a "PrimaryKey" class to provide each entity bean with a unique, serializable identity, and in accord with the EJB 1.1 specification, any base type attribute of the EJB can be declared to be the primary key.

As with session beans, the tools for a container generate additional classes for an entity bean at deployment time to implement the home and remote interfaces. The additional classes enable the container to intercede in all client calls on the same entity bean. The container also generates the serializable Handle class to providing a method to identify the entity bean within a specific life cycle. The additional classes can be implemented to mix in container-specific code for performing customized operations and functionality. Each container provides a class to provide metadata to the client. And a container also manages persistence of selected fields of the entity bean where specified by a particular bean.

A container supports the following values for the transaction attribute of an Enterprise JavaBean:

"Not Supported"—The bean runs outside the context of a transaction, and existing transactions are suspended for the duration of method calls.

"Required"—This method call requires a transaction context, so if one exists, it will be used, and if none exists, a transaction context will be created.

"Supports"—This method call uses the current transaction context if one exists, and will not create a transaction context if none exists.

"Requires New"—Containers create new transactions before each method call on the bean, and commit transactions before returning.

"Mandatory"—This method call requires a transaction context, and if none exists an exception is thrown.

"Never"—This method call requires that no transaction context be present. If one exists, an exception is thrown.

Only session beans can start their own transactions; in other words, bean-managed transactions are not supported for Entity beans and the container suspends any current transaction in the client context. Thus, in the bean's method implementation, the bean initiates the transaction through the UserTransaction interface. In stateful beans, the container associates the bean instance with the same transaction context across subsequent method calls until the bean explicitly completes the transaction. However, stateless beans are not allowed to maintain transaction context across method calls. Each method invocation must complete any transaction that method initiates.

In regard to persistence of the data of entity beans, there are two types of persistence: container-managed and bean-managed. In container-managed persistence, entity bean data is automatically maintained by the container using one of several methods. For example, a container implemented on top of a relational database management system (RDBMS) may manage persistence by storing each bean's data as a row in a table. Otherwise, the container can use Java programming language serialization for persistence. When a bean's persistence is container managed, the bean specifies which of bean's fields are to be retained. In bean-managed persistence, the bean is entirely responsible for storing and retrieving that bean's instance data. The EntityBean interface provides methods for the container to notify an instance when the EntityBean needs to store or retrieve its data.

In an EJB environment, changes can typically only be made by manually changing code and "redeploying" the EJB. The changes involve the generation of a number of supporting classes that are specific to the target EJB server. Thus, the common method to replace a business class requires taking down and restarting the entire server environment so that the new classes can be loaded.

It would therefore be advantageous to provide a system and method for making changes in a J2EE environment, such as added new class or altering existing classes, at runtime of the system with minimal interruption. In such system and method, new functionality could be introduced without needing to redeploy the entire application, and without further manual coding and compiling of the system software. It is thus to the provision of such a system and method for defining, configuring and using dynamic, persistent Java classes that the present invention is primarily directed.

SUMMARY OF THE INVENTION

Briefly described, the present invention is a system, method, and computer program for the creation and implementation of configurable Java classes on a computer platform executing instructions based upon at least a set of Java language instructions. The configurable Java class is created as an instance of a metaclass object included within the set of Java language instructions, and the configurable metaclass object includes a plurality of subclasses and interfaces wherein each interface includes one or more methods to alter the attributes and methods of the Java class instance of the metaclass object. The system includes a computer platform executing instructions based upon at least a set of Java language instructions, and a configurable metaclass object is included within the set of Java language instructions. The plurality of subclasses and interfaces of the metaclass object include methods to selectively alter the attributes and methods of a Java class instance of the metaclass object without having to redeploy the system or recode the Java class. The metaclass object thus allows the reconfiguration of a configured Java class with dynamic and configured methods through one or more of the interfaces.

The present invention is preferably implemented on a J2EE platform, and therefore, the class instances of the metaclass object are preferably implemented as persistent entity Enterprise JavaBeans. The plurality of interfaces is preferably comprised of a dynamic entity interface that includes a method container interface and a property container interface, and the dynamic entity interface includes the methods for altering the Java class instances of the metaclass object. The method container interface and property container interface are read-only interfaces that allow the passing of immutable objects. The metaclass object can be coded in XML, Java, or any other programming language with like functionality.

The invention also comprises a computer program embodied on a computer-readable medium, such volatile and permanent memory and secondary storage, and the program enables a configurable persistent Java class within a set of Java language instructions including a configurable metaclass object. Within the program, the class instances of the metaclass object are preferably implemented as a persistent entity Enterprise JavaBean. And the metaclass object further preferable contains a plurality of interfaces comprised of a dynamic entity interface including a method container interface and a property container interface. The dynamic entity interface includes the methods for altering the Java class instances of the metaclass object, and the method container interface and property container interface are read-only interfaces that allow the passing of immutable objects.

The invention further comprises a method for altering a configurable Java class on a computer platform that includes the steps of creating a Java class as an instance of a metaclass object, the configurable metaclass object allowing the reconfiguration of the configured Java class with dynamic and configured methods, and selectively altering the attributes and methods of the Java class through one or more of the instantiated metaclass object interfaces.

The step of creating the Java class instances of the metaclass object is creating the Java class as a persistent entity Enterprise JavaBean. Further, the step of selectively altering the attributes and methods of the Java class is preferably altering the Java class through a dynamic entity interface including a method container interface and a property container interface, wherein the dynamic entity interface the method container interface and property container interface allow the passing of immutable objects.

The present invention thus allows the creation of new Java classes and the change of existing Java classes through persistent configuration, which can occur at run-time of the system without interruption of the system. New functionality can be introduced by configuring new classes rather than redevelopment and redeployment of the java classes, and includes reconfiguring both behavior and state of the class. As the created and changed Java classes are preferably implemented as Enterprise JavaBeans, the objects are available in a distributed, transactional environment. With the creation of configurable Java classes as an EJB environment, changes can be made without manually changing code and "redeploying" the Enterprise JavaBean.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
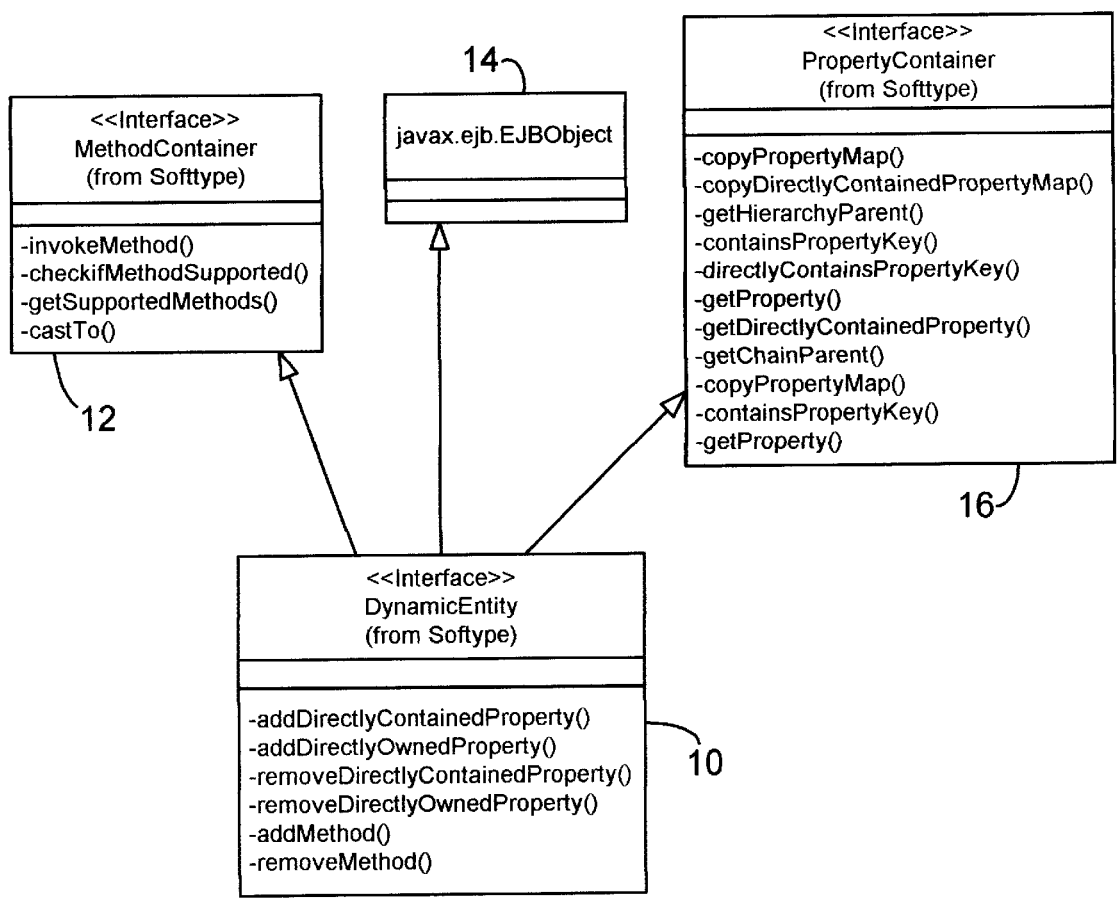
FIG. 1 is a class diagram illustrating the DynamicEntity interface derived from the "Softype" object, with a further set of interfaces derived from DynamicEntity that add or remove new attributes and methods to a class.
Figure 2:
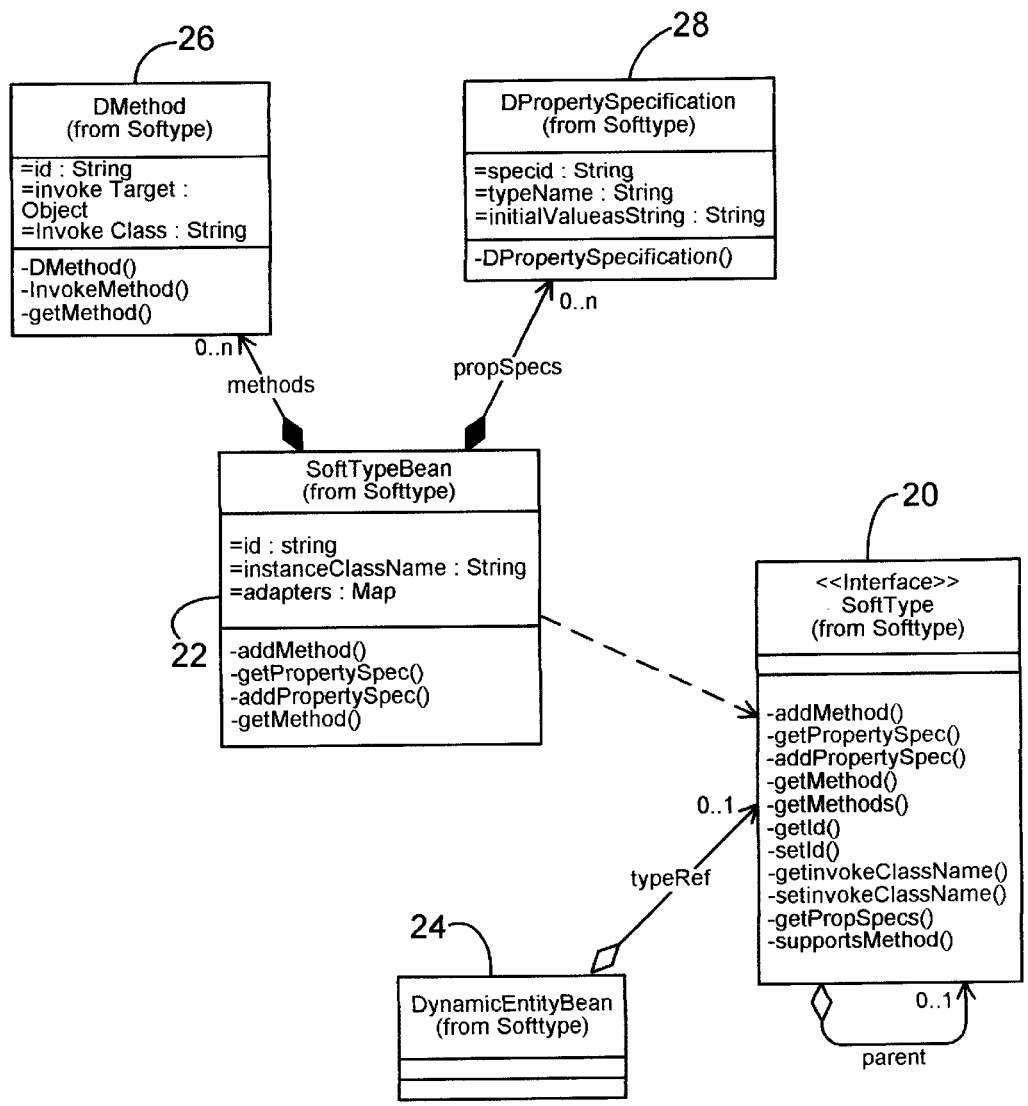
FIG. 2 is a class diagram illustrating the metaclass object for SoftType, the SoftypeBean child, the SoftypeBean derived classes, and their methods and attributes.

With reference to the figures in which like numerals represent like elements throughout, FIGS. 1 and 2 are class diagrams illustrating a configurable Java class called "Softype" with the Softype-derived classes, and their methods and attributes. For purposes of this disclosure, the attributes and methods of a Java class are classified into three categories: statically defined, dynamically defined, and configured. Statically defined attributes and methods are those methods and attributes that have been coded into the Java class source code, which is the traditional way of giving state and behavior to a class. Dynamically defined attributes and methods are persistent and can be added to an existing object at runtime and become part of that instance for the remainder of the object lifecycle. Configured methods and attributes are alterable and do not apply to solely one instance of an object. The changes can be applied to an entire class instantiated from configured object(s). When the configured object is altered, all existing instances of that object are altered in a like manner and all future instances will have the altered methods and attributes.

The invention accordingly consists of a design and implementation that allows adding dynamically defined as well as configured methods and attributes to an Enterprise JavaBean (EJB) preferably on the Java 2 platform, Enterprise Edition (J2EE). While the present invention is preferred to be implements as Enterprise JavaBeans on J2EE, the configurable classes described herein can be implemented in other Java platforms and in object-oriented language that equivalent constructs to Enterprise JavaBeans.

As shown in FIG. 1, the Softtype object includes a DynamicEntity 10 that includes the methods to add and remove directly contained properties, and also add and remove methods from a class object that instantiates Softtype. A concrete base class provides the implementation for these methods. In essence, the class contains a hashtable of key-value pairs, which contains the new attributes. This hashtable is persisted with the rest of the class state. As methods do not contain persistent state, they are resolved into a list of java.lang.reflect.Method objects. The DynamicEntity 10 has as derived therefrom the MethodContainer Interface 12, which includes methods to alter contained methods in the configured Java Class, an Enterprise JavaBean (shown as javax.ejb.EJBObject 14) as is known in J2EE, and a PropertyContainer Interface 16, which include methods to alter contained properties of the configurable Java class instance. The MethodContainer Interface 12 and PropertyContainer Interface 16 are read-only interfaces to allow the passing of immutable objects.

With reference to FIG. 2, the Softype interface 20 creates a SofttypeBean 22 as an instance thereof having at least key attributes and methods that allow the altering of the attributes and methods of the SofttypeBean 22. The Softype Interface 20 supports the DynamicEntityBean 24, and contains the methods to allow run-time configuration of the Softtype instances the attributes and methods for a class are stored in the "Softype" meta-class object such that each SoftType instance represents a particular configuration and acts as a factory for the instantiation of concrete instances. The SoftTypeBean 22 has the same set of attributes and methods defined in the DynamicEntity Interface 10, such that the methods and attributes of the SoftTypeBean 22 can be dynamically defined and altered. Information about the properties that are to be added to each new instance of a certain type are stored in an object of type DpropertySpecification 28, which serves as the factory for the new property. Dynamic methods are encapsulated in a DMethod object 26, which contains the reflection Method object. Properties are added to each new instance using the interface described above. Methods, however, have no state and thus need not be stored on each instance. The methods remain on the SoftTypeBean 22, to which the DynamicEntityBean 24 has a reference at runtime. The DynamicEntityBean 24, as well as the SoftType classes, is implemented as persistent Entity Enterprise JavaBeans.

SoftType objects also support the notion of inheritance by leveraging the "chain of responsibility" pattern wherein each SoftType instance has a reference to a "parent" instance. Dynamic properties and methods will be resolved through the parent if they have not been defined locally. Thus, a local dynamic method implementation will override one defined on the parent.

The present invention accordingly provides a system for providing configurable classes in a Java-based environment which includes a computer platform to execute the instructions based upon at least a set of Java language instructions, the computer platform being any processor or programmable hardware, and can include any computer architecture such as a personal computer, mainframe, fat or thin client, or client-server architecture. The system further includes the configurable metaclass object, such as SoftTypeBean 22, included within the set of Java language instructions, and the configurable metaclass object including a plurality of subclasses and interfaces, such as DynamicEntity Interface 10, MethodContainer Interface 12, and PropertyContainer Interface 16, wherein each interface includes one or more methods to alter the attributes and methods of a Java class instance of the metaclass object. It can also be seen that the present invention provides a computer program, preferably in Java, embodied on a computer-readable medium, to include primary and secondary storage and permanent and volatile memory, for enabling a configurable persistent Java class. The computer program is comprised a set of Java language instructions including a configurable metaclass object, such as SoftTypeBean 22, included within the set of Java language instructions, and the configurable metaclass object includes a plurality of subclasses and interfaces, such as DynamicEntity Interface 10, MethodContainer Interface 12, and PropertyContainer Interface 16, wherein each interface includes one or more methods to alter the attributes and methods of a Java class instance of the metaclass object.

Moreover, the use of the configurable Java class provides a method for altering the configurable Java class on a computer platform, as described above. The method includes the steps of creating a Java class as an instance of a metaclass object, such as a SoftTypeBean 22, where the configurable metaclass object including a plurality of subclasses and interfaces, such as DynamicEntity Interface 10, MethodContainer Interface 12, and PropertyContainer Interface 16, wherein each interface includes one or more methods to alter the attributes and methods of the Java class instance of the metaclass object, and the step of selectively altering the attributes and methods of the configurable Java class through one or more of the instantiated metaclass object interfaces. Consequently, the metaclass object allows the reconfiguration of the configured Java class derived from the SoftType object (such as SoftTypeBean 22) with dynamic and configured methods In an exemplary implementation of the SoftType object and constituent classes, an XML file can be input to the J2EE platform with the definitions of the dynamic properties and methods. One of skill in the art would be familiar with several tools for XML file creation and input into a J2EE platform. The following XML schema describes the input XML data to construct the configurable Java class on the Java platform:

```
XML data to construct the configurable Java class on the Java platform:
<?xml version="1.0"?>
<schema xmlns="http://www.w3.org/2000/10/XMLSchema"
    targetNamespace="http://www.ibm.com/softtype"
xmlns:softtype="http://www.ibm.com/softtype">
    <element name="SoftTypeDefinitions" type="softtype:SoftTypeDefinition"/>
    <complexType name="SoftTypeDefinition">
        <sequence>
            <element name="name" type="string" minOccurs="1">
                <annotation>
                    <documentation>the name of the softtype, this serves as the key to find
                    the particular softtype</documentation>
                </annotation>
            </element>
            <element name="version" type="string">
                <annotation>
                    <documentation>the version of the softtype </documentation>
                </annotation>
            </element>
            <element name="instance-class" type="string">
                <annotation>
                    <documentation> The type of the class that will hold instances of
                    this type. This field is not used yet, since new instances are always
                    created through a factory which knows the type, but it may be used
                    later or for code generation purposes.</documentation>
                </annotation>
            </element>
            <element name="parent" type="string" minOccurs="0"
                            maxOccurs="1">
                <annotation>
                    <documentation>Each softtype can have a parent, whose
                    specification
                    is inherited.</documentation>
                </annotation>
            </element>
            <element name="interface" type="softtype:interface" minOccurs="0"
            maxOccurs="unbounded">
                <annotation>
                    <documentation>A collection of methods and properties that the
                    softtype supports.</documentation>
                </annotation>
            </element>
            <element name="adapters" type="softtype:adapter" minOccurs="0"
            maxOccurs="unbounded">
                <annotation>
                    <documentation>A collection of adapters that the softtype can
                    be cast
                    to.</documentation>
                </annotation>
            </element>
```

-continued

```
            <element name="comments" type="string"/>
        </sequence>
    </complexType>
    <complexType name="interface" abstract="true">
        <annotation>
            <documentation>Each interface that a softtype supports is identified by
            its
            name.</documentation>
        </annotation>
        <sequence>
            <element name="name" type="string"/>
        </sequence>
    </complexType>
    <complexType name="method">
        <complexContent>
            <extension base="softtype:interface">
                <sequence>
                    <element name="holderclass" type="string">
                        <annotation>
                            <documentation>The method's holderclass is a subclass
                            of DMethod that supports the invocation of the
                            configured method.</documentation>
                        </annotation>
                    </element>
                </sequence>
            </extension>
        </complexContent>
    </complexType>
    <complexType name="property">
        <complexContent>
            <extension base="softtype:interface">
                <sequence>
                    <element name="class" type="string"/>
                    <element name="initial Value" type="string" minOccurs="0">
                        <annotation>
                            <documentation>The default value of the property,
                            which is only used if a constructor exists that takes a
                            String input parameter.</documentation>
                        </annotation>
                    </element>
                </sequence>
            </extension>
        </complexContent>
    </complexType>
    <complexType name="adapter">
        <sequence>
            <element name="classname" type="string"/>
            <element name="typename" type="string"/>
        </sequence>
    </complexType>
</schema>
```

The dynamic properties are stored persistently through known methods, such as by being serialized and stored in a binary large object (BLOB) column, or being stored as varchars, such as in IBM DB2. In such form, queries can be run on the stored data using XPath statements for the search.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. A system for providing configurable classes in a Java-based environment, comprising:
   a computer platform executing instructions based upon at least a set of Java language instructions; and
   a configurable metaclass object included within the set of Java language instructions, the configurable metaclass object including a plurality of subclasses and interfaces wherein each interface includes one or more methods to alter the attributes and methods of a Java class instance of the metaclass object, the metaclass object allowing the reconfiguration of a configured Java class with dynamic and configured methods through one or more of the interfaces.

2. The system of claim 1, wherein class instances of the metaclass object are implemented as a persistent entity Enterprise JavaBean.

3. The system of claim 2, wherein the plurality of interfaces is comprised of a dynamic entity interface including a method container interface and a property container interface, the dynamic entity interface including the methods for altering Java class instances of the metaclass object, and the method container interface and property container interface being read-only interfaces which allow the passing of immutable objects.

4. The system of claim 1, wherein the metaclass object is coded in XML.

5. The system of claim 1, wherein the metaclass object is coded in Java.

6. A computer program embodied on a computer-readable medium, the computer program for enabling a configurable persistent Java class, the program comprising a set of Java language instructions including a configurable metaclass object, the configurable metaclass object including a plurality of subclasses and interfaces wherein each interface includes one or more methods to alter the attributes and methods of a Java class instance of the metaclass object, the metaclass object allowing the reconfiguration of a configured Java class with dynamic and configured methods through one or more of the interfaces.

7. The program of claim 6, wherein class instances of the metaclass object are implemented as persistent entity Enterprise JavaBeans.

8. The program of claim 7, wherein the plurality of interfaces is comprised of a dynamic entity interface including a method container interface and a property container interface, the dynamic entity interface including the methods for altering Java class instances of the metaclass object, and the method container interface and property container interface being read-only interfaces which allow the passing of immutable objects.

9. The program of claim 6, wherein the metaclass object is coded in XML.

10. A method for altering a configurable Java class on a computer platform, comprising the steps of:

creating a Java class as an instance of a metaclass object, the configurable metaclass object including a plurality of subclasses and interfaces wherein each interface includes one or more methods to alter the attributes and methods of the Java class instance of the metaclass object, the metaclass object allowing the reconfiguration of the configured Java class with dynamic and configured methods; and selectively altering the attributes and methods of the Java class through one or more of the instantiated metaclass object interfaces.

11. The method of claim 10, wherein the step of creating the Java class instances of the metaclass object is creating the Java class as a persistent entity Enterprise JavaBean.

12. The method of claim 11, wherein the step of selectively altering the attributes and methods of the Java class is altering the Java class through a dynamic entity interface including a method container interface and a property container interface, wherein the dynamic entity interface the method container interface and property container interface allow the passing of immutable objects.

13. The method of claim 10, wherein the step of creating a Java class as an instance of a metaclass object is creating a Java class as an instance of a metaclass object coded in XML.

* * * * *